Patented May 1, 1928.

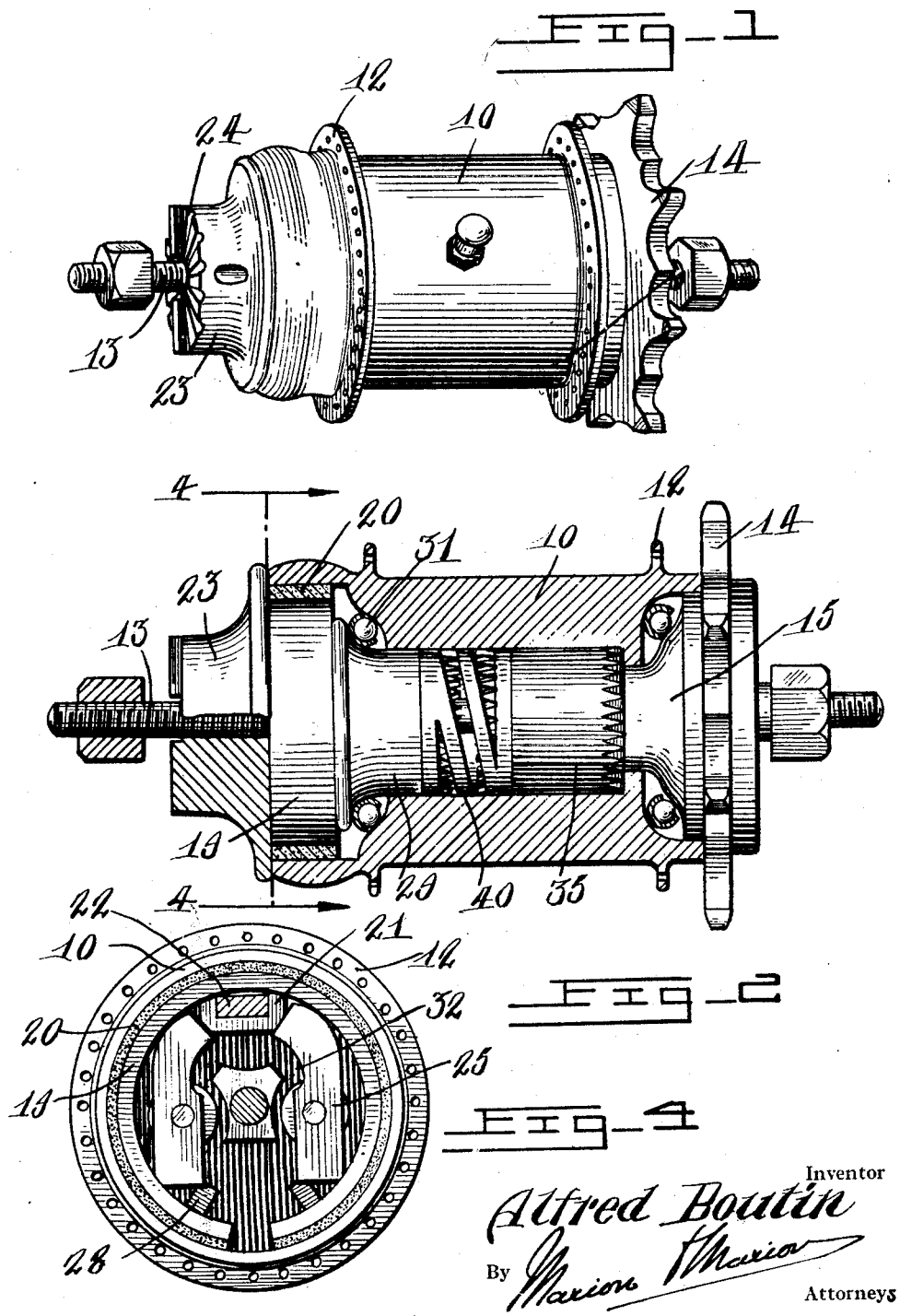

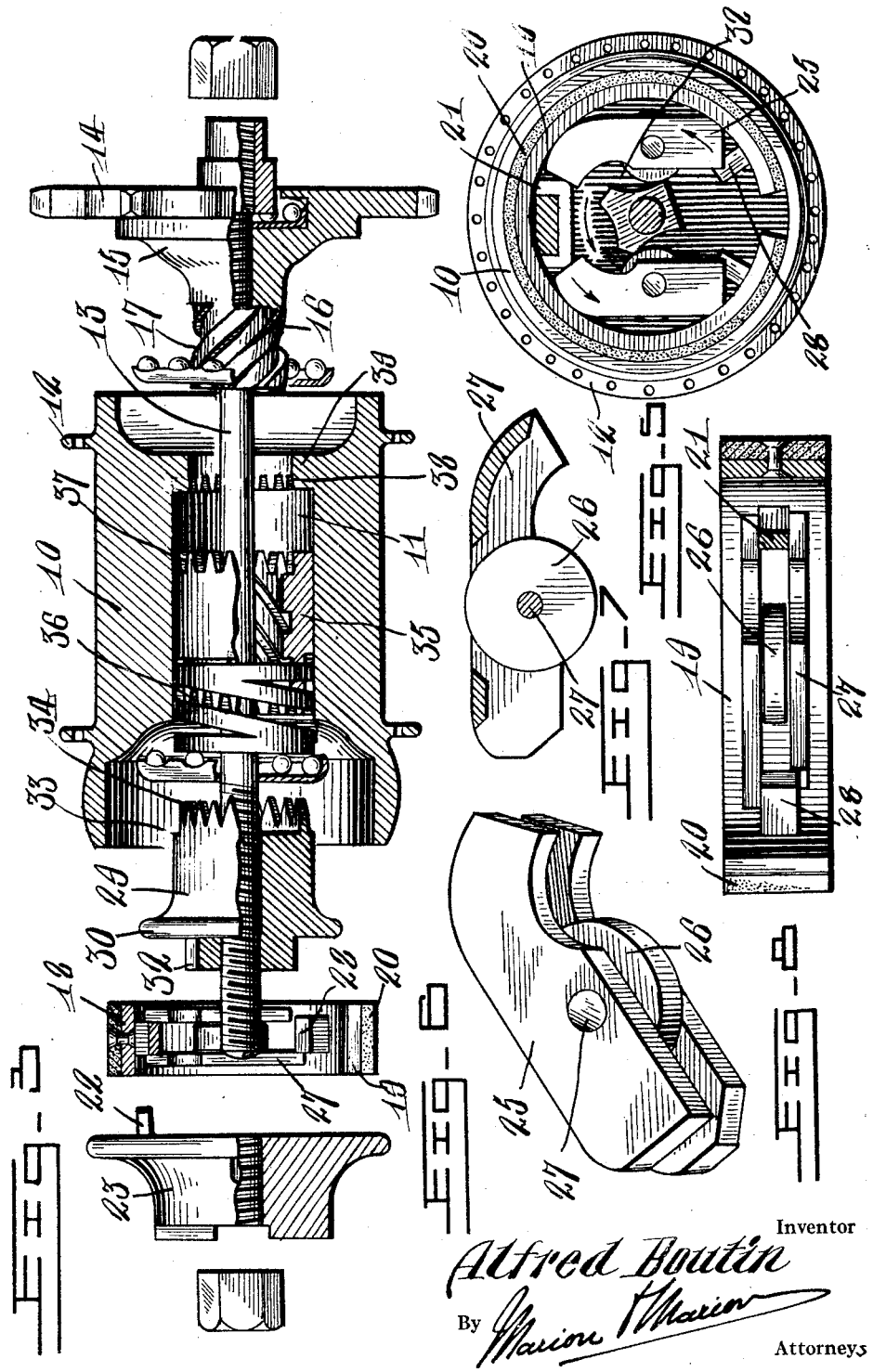

1,667,924

UNITED STATES PATENT OFFICE.

ALFRED BOUTIN, OF VICTORIAVILLE, QUEBEC, CANADA.

BRAKE.

Application filed June 10, 1927. Serial No. 197,938.

The present invention relates to improvements in brake mechanism and has particular reference to a brake particularly applicable for bicycles and similar vehicles.

An important object of the invention is the provision of a brake which will be durable in construction and effective in operation.

A further object of the invention is the provision of a brake designed so that the braking elements will be positive in action and eliminate slipping or creeping of the clutch.

Another object of the invention is the provision of a brake mechanism arranged so that reverse movement of the driving member will cause quick and effective braking action.

Still another object of the invention is to provide a brake structure arranged so that the component elements will not impair the driving operation of the hub.

A still further object of the invention is the provision of a brake structure assembled so that the various component elements may be conveniently removed or replaced.

Other objects and advantages of the invention will become apparent as the description progresses.

In the accompanying drawings forming a part of this specification, and in which like reference characters are employed to designate corresponding parts throughout the same:—

Figure 1 is a perspective view of a brake structure in assembled position,

Figure 2 is a longitudinal sectional view through the same,

Figure 3 is a longitudinal sectional view through the brake, showing the elements in separated position, Figure 4 is a transverse sectional view taken on the line 4—4 of Figure 2 showing the brake mechanism in operative position, Figure 5 is a similar view showing the mechanism in operative braking position, Figure 6 is a perspective of one of the brake operating segments, Figure 7 is a longitudinal sectional view through the same, and Figure 8 is a central transverse sectional view through the brake mechanism.

Referring particularly to the drawings, wherein for the purpose of illustration is shown the preferred embodiment of my invention, the numeral 10 generally designates a wheel hub which is of cylindrical formation and formed with a longitudinal bore 11. The ends of the hub are formed with enlarged counterbores adapted to form bearing recesses. The exterior periphery of the hub is provided with a pair of spaced annular flanges 12 provided with equidistantly spaced openings engageable with the wheel spokes.

Extending through the bore of the hub and projecting substantially from the ends thereof, is a horizontal axle 13 screw threaded at its ends and supported in stationary position by the rear fork of the vehicle frame.

Rotatably mounted on one end of the axle is a drive member 14 preferably in the form of a toothed sprocket. The sprocket is formed with a diminishing shoulder 15 at its inner side. Extending laterally inwardly from the shoulder is a tubular sleeve 16 adapted to project within the bore of the hub and formed with exterior spiral threads 17.

Fixed upon the opposite end of the axle 13 and disposed within the counterbore, is an expansible brake structure 18 embodying a resilient split ring 19 spaced from the interior wall of the hub and a brake band 20 secured upon the outer periphery of the ring. The ring 19 and band carried thereby normally assume a contracted position so that the band is uniformly spaced within the wall of the hub. Attached to the upper continuous portion of the brake ring 19 is a U-shaped bracket 21 adapted to slidably engage a transverse elongated lug 22 formed on and projecting from the inner face of a cap 23. This cap is threaded on to one end of the axle and its outer face is formed with radial grooves 24 adapted to frictionally engage the vehicle frame to prevent rotation thereof. The brake structure is thus rigidly supported in stationary position on the axle and is adapted to be intermittently expanded for the application of the brake upon the hub.

Supported in spaced position within the resilient ring 19 are a pair of complementary brake actuating segments 25 each embodying a pair of spaced longitudinal bars curved at their upper ends. Rotatably supported between the bars of the segments are rollers 26 rotatable upon pivot pins 27 and arranged to project inwardly of the bars. These segments are supported by contact with the upper U-shaped bracket 21 and radial support pins 28 fixed in the lower portion of the brake ring to support the lower ends of the segments. These segments are radially adjustable to expand the brake ring and band in the application of the brake.

Rotatably mounted in the end of the hub 10 is a cylindrical clutch section 29, the outer end being formed with an expanded annular collar 30 held against the brake mechanism 18. Disposed between the collar 30 and the end recess of the hub are roller bearings 31 adapted to permit convenient rotation of the hub section and prevent axial movement thereof when the structure is assembled.

The outer face of the section 29 carries a plurality, preferably three, outwardly projecting fingers 32 of noncircular tapered form arranged adjacent the central axis so as to operatively engage the rollers 26 of the segments to separate the segments and expand the brake ring. The inner end of the clutch section 29 is formed with an annular flange 33, the external diameter of which is less than the diameter of the section body and the outer edge of which is serrated to form tapered clutch teeth 34.

Slidably mounted in the opposite end of the hub bore is a complementary clutch section 35, this section being of hollow cylindrical formation and formed with interior spiral threads adapted to engage the threads 17 formed on the sprocket sleeve 16. The inner end portion of this clutch section has a reduced exterior periphery conforming to the periphery of the flange 33 of the opposed section 29, this end of the section 35 being formed with complementary clutch teeth 36 intermittently engageable with the teeth 34 formed in the adjacent end of the opposed clutch section. The outer end of the clutch section 35 is also formed with teeth 37 intermittently engageable with corresponding teeth 38 formed upon the inner face of a flange 39 formed in one end of the hub.

The complementary clutch sections 29 and 35 are normally urged to adjacent contacting positions by means of a helical tension spring 40 secured about the adjacent reduced portions of the sections.

In operation, during the forward driving revolution of the sprocket 14, the threaded sleeve 16 threadedly engages the clutch section 35 and slides the same axially against the tension of the spring towards the sprocket end of the hub, so that the complementary teeth 37 and 38 will engage. Thus, a positive driving connection between the sprocket, clutch section 35, and the hub is obtained whereby the hub and wheel mounted thereon, are forwardly rotated to drive the vehicle. When the drive sprocket 14 is held in idle stationary position, the spring 40 will axially slide the clutch section 35 into contact with the rotary complementary section 29 so that the section 35 is disconnected from the hub and the hub permitted to rotate about the axle independently of the drive sprocket.

To apply the brake and arrest the rotary movement of the hub about the axle, the sprocket is rotated in a reverse direction counter to its drive movement. This will cause the clutch section 35 to be positively moved in a lateral position to engage the complementary section 29. Continued reverse movement of the sprocket will cause rotation of both clutch sections in unison so that the fingers 32, normally releasing the segment rollers 26, are rotated within the brake structure causing separation of the brake segments and expansion of the brake ring and band so that the band will be tightly forced against the inner periphery of the hub and gradually arrest its movement.

An essential characteristic of this construction is the positive engagement of the elements in the forward driving and braking action whereby the clutch elements will be securely connected with the hub and brake structure respectively. This will avoid any slipping movement in the operation of the brake, an objectionable feature in the commonly used forms of brakes at present employed for this purpose.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus fully described my invention, I claim:—

1. A vehicle brake apparatus comprising a stationary axle, a hub rotatably mounted on the axle, a drive member mounted for rotation in one end of the hub, expansible brake mechanism fixed upon the opposite end of the axle and engageable with the hub, and clutch mechanism operable to rotate the hub with the drive member in the forward driving movement of the said member and operate the brake mechanism to arrest the movement of the hub when the rotary movement of the drive member is reversed.

2. A wheel brake comprising a support axle, a hub rotatable about the axle, a drive member rotatably mounted on one end of the axle, brake mechanism fixed upon the opposite end of the axle within the hub, and clutch mechanism including a pair of complementary, relatively movable, sections adapted to intermittently drive the hub simultaneously with the drive member, release the hub for independent movement with respect to the drive member and apply the brake to the hub by reverse movement of the drive member.

3. In a wheel brake including a stationary support axle, a hub adapted to rotate about the axle, a drive member journaled on one end of the axle provided with a threaded inwardly extending sleeve, brake mechanism fixed on the axle and adapted to intermittently engage the hub to arrest the movement thereof, clutch mechanism including a rotatable section adapted to operate the brake mechanism and a complementary rotatable and axially movable section periodically engageable with the threaded sleeve of the drive member to positively drive the hub in unison with the drive member, disengage the hub when the drive member is at rest and apply the brake to the hub upon reverse movement of the drive member.

4. In a wheel brake including a support axle, a hub adapted to rotate about the axle, a drive member journaled on one end of the axle, a hub adapted to rotate about the axle, a drive member journaled on one end of the axle provided with a threaded extension, expansible brake mechanism fixed on the opposed end of the axle to intermittently engage the hub to arrest movement thereof, clutch mechanism operatively mounted in the hub including a section rotatable on the axle independent of the hub, brake actuating fingers carried by the said section operable to actuate the brake upon rotation of the section, and a complementary clutch section yieldably urged into contact with the first section, the said complementary section having an interior threaded bore adapted for rotatable and axial movement within the hub, and means whereby the slidable clutch section will positively engage the extension of the drive member of the hub during the positive driving movement of the drive member, disengage the hub when the drive member is addressed, and positively engage the rotatable opposed clutch section upon reverse movement of the drive member to apply the brake.

5. In a wheel brake including a support axle, a hub adapted to rotate about the intermediate portion of the axle, a drive member journaled on one end of the axle, a threaded extension secured to the drive member and projecting within the bore of the hub, brake mechanism fixed on the opposed end of the axle operable to frictionally engage the hub and arrest the movement thereof, clutch mechanism including a rotatable clutch section having its inner edge formed to provide clutch teeth, brake actuating fingers formed on the outer end of the rotatable section adapted to actuate the brake upon rotary movement, a complementary clutch section rotatably and slidably mounted in the hub provided with an interior threaded bore engageable with the threaded extension of the drive member, clutch teeth formed on one edge of the slidable clutch section adapted to intermittently engage complementary teeth formed in the hub, clutch teeth formed on the opposed edge of the slidable section engageable with the teeth on the complementary rotatable section, and a spring member associated with the clutch sections adapted to urge the same into engagement, the said slidable sections being adapted to engage the hub during the forward driving movement of the drive member, release the hub when the drive member is at rest, and engage the complementary clutch section to apply the brake when the drive member is reversed.

6. In a wheel brake including a support axle, a hub formed with a longitudinal bore rotatable about the axle, a drive member journaled on one end of the axle, clutch mechanism mounted within the hub operable to drive the hub in unison with the drive member during the driving movement of the drive member and to disengage the hub when the drive member is at rest, brake mechanism mounted in one end of the hub including a resilient expansible ring engageable with the inner periphery of the hub normally contracted to disengage the said periphery, a pair of segments arranged in opposed position within the ring, and means carried by the clutch mechanism adapted to separate the brake segments and expand the brake ring to engage the hub when the drive member is reversed.

7. In a wheel brake including a support axle, a hub formed with a longitudinal bore rotatable about the axle, a drive member journaled on one end of the axle, clutch mechanism mounted within the hub operable to drive the hub in unison with the drive member during the driving movement of the drive member and to disengage the hub when the drive member is at rest, brake mechanism mounted in one end of the hub including a split expansible ring, a brake band fixed on the outer periphery of the ring, the said ring and band being normally contracted to disengage the hub and expanded to engage the same, a pair of opposed segments positioned within the ring, rollers journaled in the segments projecting inwardly from the segments, and brake actuating fingers carried by the clutch mechanism operable to engage the rollers and expand the segments and brake ring during the reverse rotary movement of the drive member.

In witness whereof I have hereunto set my hand.

ALFRED BOUTIN.